United States Patent [19]

Cirule et al.

[11] 3,960,395
[45] June 1, 1976

[54] EXPANSION CLAMP
[75] Inventors: Fred M. Cirule, Parsippany; Joseph R. Preziosi, Clark, both of N.J.
[73] Assignee: Amerace Corporation, New York, N.Y.
[22] Filed: June 17, 1974
[21] Appl. No.: 480,268

[52] U.S. Cl. .................................... 285/370; 285/39
[51] Int. Cl.² ....................................... F16L 17/00
[58] Field of Search ................. 138/97, 98; 285/15, 285/16, 370, 371, 397, 398, 39; 38/102.2

[56] References Cited
UNITED STATES PATENTS

| | | | |
|---|---|---|---|
| 1,199,952 | 10/1916 | Wedoo | 38/102.2 |
| 3,101,743 | 8/1963 | Hoke | 285/370 X |
| 3,474,832 | 10/1969 | Broadhead et al. | 138/97 |
| 3,499,667 | 3/1970 | Pfeuffer | 285/365 X |
| 3,516,446 | 6/1970 | O'Hargan et al. | 285/239 X |
| 3,840,053 | 10/1974 | Sluga | 138/97 |

FOREIGN PATENTS OR APPLICATIONS 638,184    3/1962    Canada.............................. 285/370

Primary Examiner—Dave W. Arola
Attorney, Agent, or Firm—S. Michael Bender; Richard A. Craig; Martin Sachs

[57] ABSTRACT

An expansion clamp for use with a resilient tubular gasket to provide a leakproof joint in a piping system including a substantially C-shaped circumferentially-extending member having end portions cooperating with one another and further including means for locking the end portions with respect to each other so as to maintain the expansion clamp, the gasket, the inner circumferential surface of the pipe in mutual compressive relation. One end of the C-shaped member is also provided with means to prevent axial and radial displacement of the other end portion.

2 Claims, 16 Drawing Figures

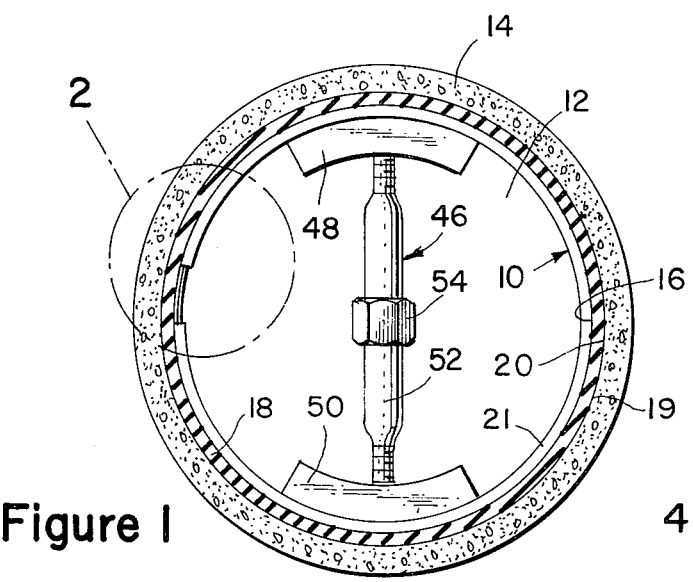
Figure 1
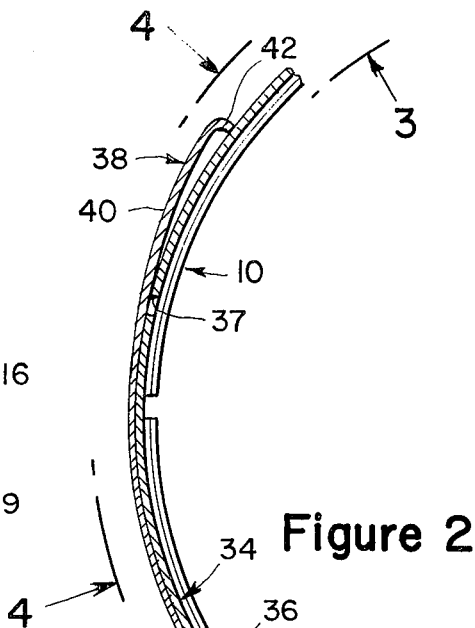
Figure 2
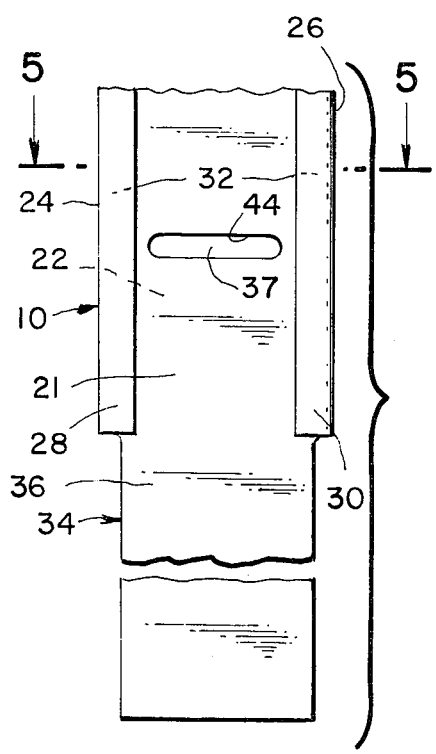
Figure 3
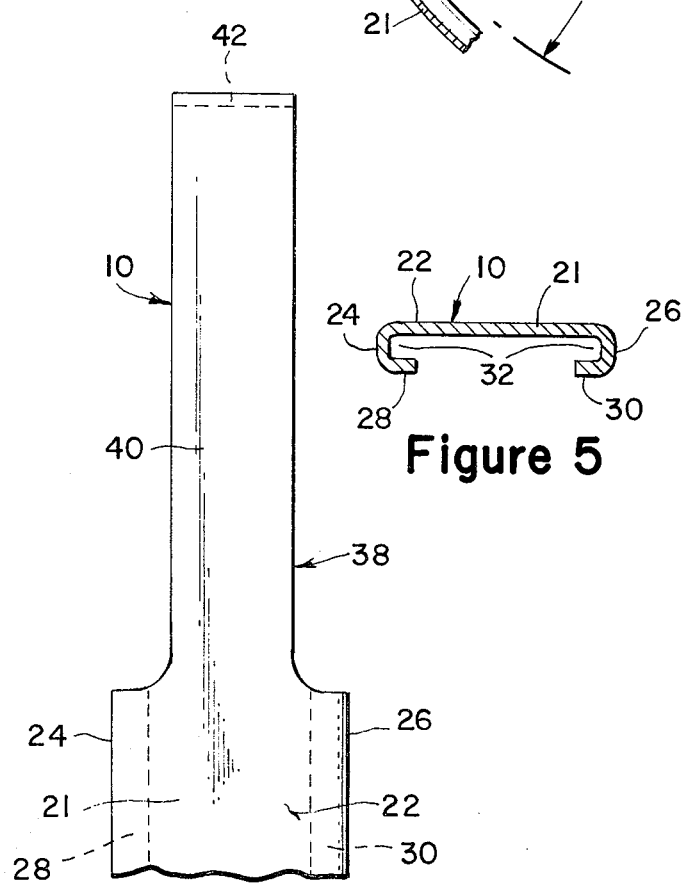
Figure 4
Figure 5

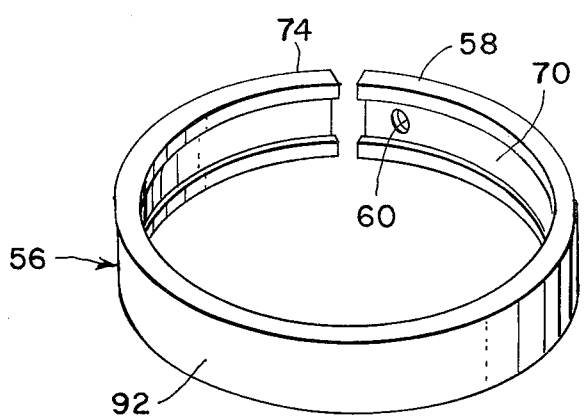
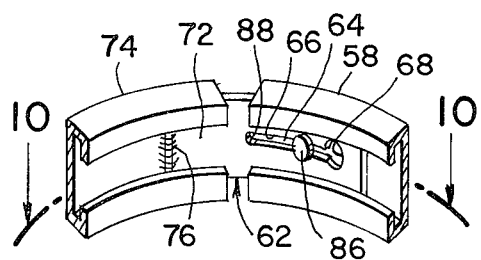
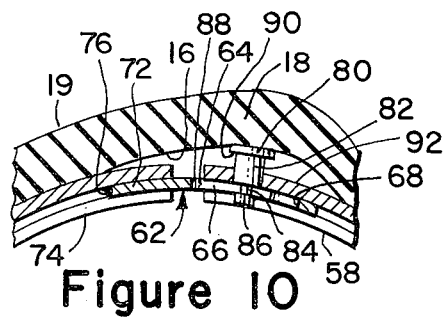
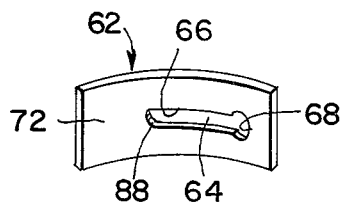
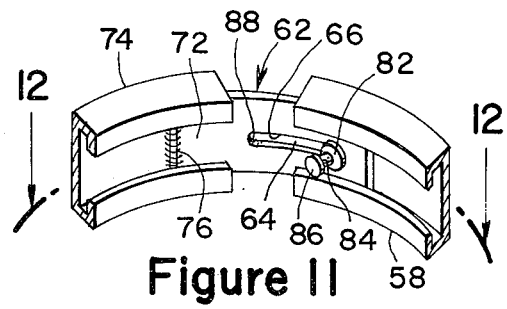
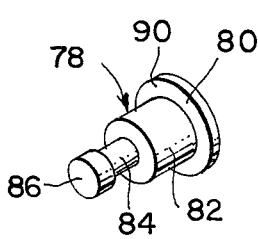
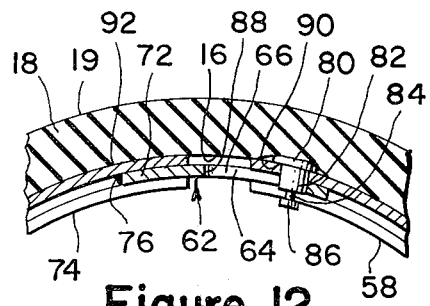

EXPANSION CLAMP

BACKGROUND OF THE INVENTION

The present invention relates to expansion clamps and, more particularly, to an expansion clamp for use with a resilient tubular gasket or boot to provide a leakproof joint in a piping system.

Clamps used for the repair of pipe leaks at a joint or elsewhere are well known in the art. Generally these clamps are applied to the external pipe surface in the vicinity of the leak to effectively prevent the pressurized pipe contents from escaping. However, frequently a repair or connection must be made to a pipe which is buried having therefore an inaccessible external surface. Thus, internal expansion clamps have been devised to provide a method of repairing the pipe from the inside thereof. Frequently these pipes have relatively large internal diameters, e.g., a sewer waste line, where the repair connection thereto is made via a resilient gasket or rubber boot which is affixed to the internal surface of a sewer pipe by means of an expansion clamp being expanded to supply the necessary compressive forces and then locked into position. The expansion clamp also may be used to secure a rubber boot in a sewer manhole inlet opening to effect a seal so that when the other end of the boot is attached to the inlet pipe a sealed, leakproof joint is obtained.

Presently used expansion clamps generally include radially internally extending protrusions which are adjusted until the expansion clamp sufficiently expands to tightly engage the inner surface of a pipe section or joint thereby effecting a leakproof seal. Some of the other known expansion clamps include a multiplicity of elements and require elaborate and tedious installation procedures.

SUMMARY OF THE INVENTION

Against the foregoing background, it is an object of the present invention to provide a relatively simple, rugged, easily installable, expansion clamp having a minimum of elements and including self-aligned, self-contained means for locking it into position, thus facilitating rapid and easy installation thereof.

It is another object of the present invention to provide an expansion clamp for a pipe joint relatively free from radially internally extending projections thereby preventing interference with fluid flow within the pipe.

To the accomplishment of the foregoing objects and advantages, the expansion clamp of the present invention comprises, in brief, a member extending circumferentially with respect to the radially inner surface of a gasket lined recess. The member is adapted to be maintained in a compressive relation with the radially inner surface of the gasket and the inner surface of the annular recess and has a substantially C-shaped transverse cross-section to define a channel with the opening thereof extending inwardly. One circumferential end of the channel terminates in a portion adapted to be received within the other circumferential end of the channel. The member further includes means for locking one circumferential end portion relative to the other circumferential end in a predetermined fixed position to maintain the aforementioned compressive relation.

Still other objects and advantages as well as a more complete understanding of the present invention will be more apparent from a study of the following detailed description of the invention with reference to the accompanying drawing.

BRIEF DESCRIPTION OF THE DRAWING

FIG. 1 is a cross-sectional view of a pipe pictorially showing the expansion clamp of the present invention in installed position therein and an installation tool therefor;

FIG. 2 is an enlarged fragmentary view in cross-section of the portion indicated by the broken circle in FIG. 1;

FIG. 3 is a view of one end of the expansion clamp taken substantially along the line 3—3 of FIG. 2;

FIG. 4 is a view of the other end of the expansion clamp taken substantially along the line 4—4 of FIG. 2;

FIG. 5 is a cross-sectional view taken along the line 5—5 of FIG. 3;

FIG. 6 is a perspective view of a portion of an alternative preferred embodiment of the present invention, in particular, of a circumferentially extending expansion clamp member;

FIG. 7 is a perspective view of a link member adapted to be affixed proximate one end of the member shown in FIG. 7;

FIG. 8 is a perspective view of a pin member adapted for use with the link member depicted in FIG. 7;

FIG. 9 is a fragmentary perspective view of the alternative preferred embodiment of FIGS. 6–8 prior to being expanded to its locked position;

FIG. 10 is a cross-sectional view taken substantially along the line 10—10 of FIG. 9;

FIG. 11 is a fragmentary perspective view of the alternative preferred embodiment of FIGS. 6–8 after it has been expanded and locked in position;

FIG. 12 is a cross-sectional view taken substantially along the line 12—12 of FIG. 11;

DESCRIPTION OF THE PREFERRED EMBODIMENT

Figure 13:
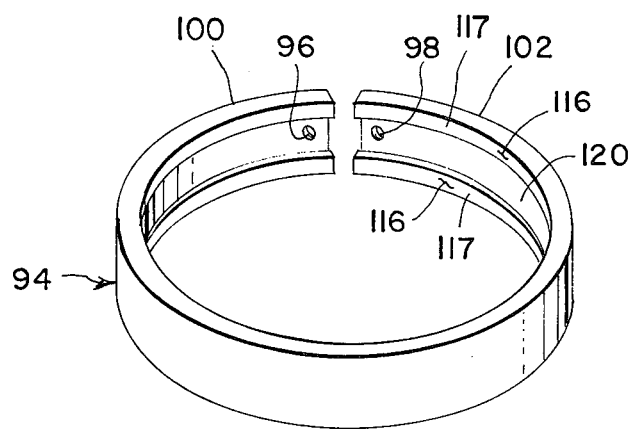
FIG. 13 is a perspective view of another alternative preferred embodiment of the circumferentially extending expansion clamp member.

Turning now to FIG. 1, there is shown the expansion clamp of the present invention generally indicated by reference numeral 10. The clamp 10 is depicted installed in an annular recess 12 such as that provided by a conventional sewer pipe 14. The clamp 10 when installed in its operative position applied compressive forces to the inner surface of a resilient tubular gasket or rubber boot 18 which is disposed between the circumferentially extending clamp 10 and the inner circumferential surface 10 of the sewer pipe 14. The gasket 18 thus has its outer surface 19 in intimate compressive contacting engagement with the inner circumferential surface 20 of the pipe 14. In this manner, the compressive forces radially and circumferentially exerted by the outer surface 22 of the clamp member 21 against the gasket inner surface 16 afford a leakproof seal or joint between the pipe and the gasket in axial alignment therewith. It will be appreciated that the clamp 10 in combination with the gasket 18 may, in substantially the same manner, also be used to seal a hole or crack formed in the pipe, or to provide a joint between two axially aligned pipe sections.

Referring now to FIGS. 2 through 5, there is depicted enlarged fragmentary views of the portion of the clamp 10 within the broken circle 2 of FIG. 1. In accordance with the invention, the clamp 10 is formed from the member 21 which has a substantially C-shaped transverse cross-section as shown in FIG. 5. Preferably, member 21 is of metallic material and is formed into the desired shape by means of conventional roller dies. The C-shaped member 21 includes a generaly flat circumferentially extending outer surface 22 which functions as a compressive force exerting or bearing surface as mentioned above. Member 21 further includes a pair of opposed, inwardly extending wall portions 24 and 26 terminating in a corresponding pair of lip portions 28 and 30 laterally extending toward one another and being disposed in a generally parallel spaced relation to surface 22, thereby forming a channel 32.

The circumferential end portion 34 of member 21 adjacent one terminus of channel 32 is in the form of an elongated relatively flat tongue 36 adapted to be slidably received within channel 32 through the latter's other terminus as best seen in FIG. 2. Member 21 further includes a transverse through aperture or slot 37 provided in member 21 proximate the said one terminus of channel 32 and the tongue 36 substantially as shown in FIGS. 2 and 3.

The latter circumferential end portion 38 of member 21 adjacent the other terminus of channel 32 may also be in the form of an elongated relatively flat tongue 40 which, however, preferably is made slightly narrower in width than tongue 36. The free end of tongue 40 is provided with a hook-shaped inwardly dependng portion 42 which is adapted to engage the periphery 44 of through aperture 37 when the clamp 10 is expanded to its predetermined operative position, thus locking the clamp in position.

It is to be noted that once the tongue 36 has been received within channel 32 through the latter's other terminus thereby forming a substantially circular shaped ring or band, tongue 36 is both axially and radially restrained, since the wall portions 24 and 26 of channel 32 prevent axial displacement and lip portions 28 and 30 prevent radial displacement thereof.

In operation, the present preferred embodiment of expansion clamp 10 is installed as follows: First the resilient tubular gasket 18 is placed into the recess or opening 12 of the pipe 14. Since the expansion clamp 10 will normally assume a condition where tongue 36 is received within the channel 32 (FIG. 2), and thus, will normally have an outer diameter less than the diameter of the bore defined by the inner surface 16 of the resilient gasket 18, it may then be quite easily inserted into the gasket opening or bore to assume the position generally shown in FIG. 1.

An expansion tool 46 having shoe-like members 48 and 50 threadably mounted on the distal ends of a rod 52 next is seated or positioned within the bore defined by the clamp 10 such that each shoe-like member 48 and 50 engages two diametrically opposed portions of the channel 32 as is also generaly shown in FIG. 1. The rod 52 is provided with a nut-like central portion 54 which may be rotated causing the shoe-like members to move outwardly or expand along the axis of threaded rod 52 in a manner similar to a conventional turnbuckle. The diameter of the expansion clamp 10 thus expands as the expansion tool 46 expands and substantially the entire circumferentially extending outer surface 22 of member 21 exerts a radial compressive force against gasket 18, thereby causing gasket 18 to form a leakproof seal relative to the inner surface of pipe 14. It will be understood that as the expansion clamp 10 expands the hook-shaped portion 42 slides along the outer surface 22 of the member 21 all of the while receiving a reactive compressive force from the inner surface 16 of gasket 18. The clamp outer diameter is thus expanded via rotation of nut 54 until the hook-shaped portion 42 reached aperture 37, whereupon the reactive compressive forces exerted by the inner surface 16 of gasket 18 causes the hook-shaped portion 42 to positively enter the aperture 37 and cause a sharp, easily detected audible sound or click. The nut 54 is then rotated in a reversed direction so as to disengage the shoe-like members from channel 32 and cause the expansion tool to contract sufficiently to be removed. When the expansion tool 46 is removed the compressive forces exerted between the inner surface 16 of the gasket 18 and the outer surface 22 of the circumferentially extending member 21 causes the hook-shaped portion 42 to firmly and securely engage the periphery 44 of aperture 37 thus locking it in position, and forming a leakproof seal.

From the foregoing, it will be apparent that by changing the relative location of through aperture 37 along the circumferential extent of member 21, expansion clamps according to the preferred embodiment of FIGS. 1–6 may be designed to fit a wide variety of differently sized pipe and/or gasket diameters.

Referring now to FIGS. 6–12, and initially to FIG. 6, there is shown an alternative preferred embodiment of the present invention comprising a C-shaped member 56 which is formed in the same manner as member 21, but does not include the end portions or tongues 36, 40. Instead there is provided proximate one end 58 of member 56 a through aperture 60, the purpose of which will be explained hereinafter.

Also provided is a link member 62 (shown in FIG. 7) having a keyhole-shaped aperture 64 which includes a relatively narrow longitudinal portion 66 and a larger circular-shaped portion 68 at one end thereof. Link member 62 is adapted to slidably engage and coact with channel 70 provided in member 56. One end of link member 62, preferably the narrow apertured end 72, is affixed to one circumferential end 74 of member 56 such as for example by a weld 76 as shown in FIG. 9.

A pin member 78, shown in FIG. 8, is provided with an annular collar 80 which has a larger diameter than that of aperture 60 provided in member 56 and functions to retain pin 78 therein as will be explained hereinafter. Extending axially from the collar 80 is cylindrically-shaped portion 82 which is provided with a diameter only slightly smaller than the circular-shaped portion 68 of keyhole aperture 64 provided in link member 62. Extending axially from portion 82 is a cylindrically-shaped portion 84 which is provided with a diameter only slightly smaller than the longitudinal portion 66 of keyhole aperture 64 provided in link member 62. Further axially extending from portion 84 is cylindrically shaped portion 86 which is provided with a diameter slightly smaller than the diameter of apertures 60 and 68 but larger than the width of the transverse portion 66 of keyhole aperture 64.

In operation the present alternative preferred embodiment of claim 10 is prepared for installation by inserting pin member 78 partially through apertures 60 and 68 (FIG. 9) after link member 72 has been inserted into channel 70 with the apetures 60 and 68 aligned. Member 56 is then allowed to compress (diameter decreased) to its normal preinstalled condition causing pin portion 84 to slidably move within the longitudinal portion 66 until it reaches the end 88 of the longitudinal portion 66 of keyhole aperture 64.

It is to be noted that here again the circumferential end portion 74 is restrained from axial as well as radial displacement by virtue of link member 62 engaging channel 70 of member 56.

The member 56 is then placed into the recess or opening 12 and in contact with the inner surface 16 of gasket 18 in the same manner as is the preferred embodiment. The expansion tool 46 is operated, as explained before, to expand the diameter of the member 56. The initial position of pin 78 will be as shown in cross-section in FIG. 9 and 10 and as the diameter of the member 56 is increased by the expansion tool 46 it will acquire the position as indicated in FIGS. 11 and 12. When the member 56 reaches its predetermined operational position, portion 82 of pin member 78 will be forced through aperture 68 by the reactive compressive forces exerted by the inner surface 16 of gasket 18 against collar 80. Since collar 80 is larger than aperture 60 its shoulder 90 will remain in intimate contact with the outer surface 92 of member 56 preventing the pin member 78 from passing therethrough. With the foregoing arrangement, the reactive compressive forces applied between the inner surface 16 of gasket 18 and the outer surface 92 of member 56 are sufficient to firmly and securely lock pin member 78 in the circular-shaped portion 68 of keyhole aperture 64, substantially as shown in FIGS. 11 and 12 thereby enabling the expansion clamp 10 and gasket 18 to form a leakproof seal or joint.

Referring now to FIGS. 13–16, and initially FIG. 13, there is shown yet another alternative preferred embodiment of the present invention comprising C-chaped member 94. Member 94 is formed in the same manner as the earlier described embodiments and is preferably provided with threaded apertures 96 and 98 proximate circumferential end portions 100 and 102, respectively.

Figure 14:
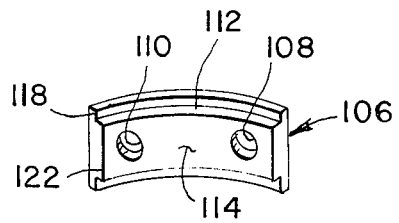
FIG. 14 is a perspective view of another alternative preferred embodiment of a link adapted to connect to both ends of the expansion clamp member shown in FIG. 13.
Figure 15:
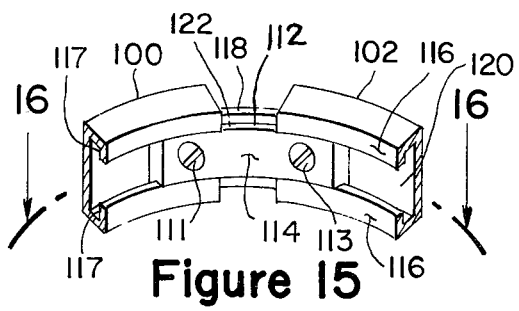
FIG. 15 is a fragmentary perspective view of the alternative preferred embodiment of the circumferentially extending expansion clamp member shown in FIG. 13 with the expansion clamp locked in position.
Figure 16:
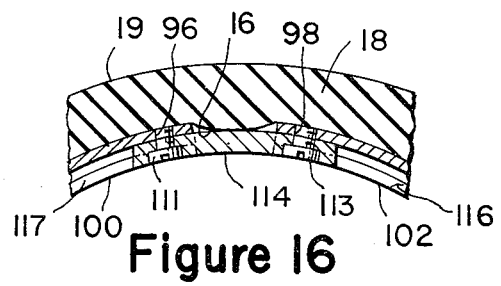
FIG. 16 is a cross-section taken substantially along the line 16—16 of FIG. 15.

A link member 106, shown in FIG. 14, is provided with an aperture 108 proximate one end thereof and another aperture 110 proximate the other end thereof. Both apertures 108 and 110 preferably are provided with a countersink adapted to mate with the head 111 of a flat head screw. The link member 106 may be provided with a step 112 increasing the thickness of the link member to that of the thickness of the C-shaped member 94 so that the inwardly directed surface 114 of link member 106 is flush with the surface 116 of the lip 117 provided on C-shaped member 94. The rearward portion 118 of link member 106 is adapted to be slidably received within the channel 120 provided in member 94 with the inwardly extending stepped portion 112 of link 106 having a transverse dimension slightly smaller than the distance between the opposed lip portion 117 to accommodate sliding movement of the link member 106.

Here again, the member 94 is installed into recess or opening 12 after link member 106 has been inserted into channel 120 with apertures 96 and 110 in alignment and screw 111 inserted through aperture 110 and caused to threadedly engage aperture 96. The expanding tool 46 is used to expand the diameter of member 94 until apertures 98 and 108 come into alignment. Then screw 113 is inserted through aperture 108 and caused to threadedly engage aperture 98 locking member 94 in the position shown in FIGS. 15 and 16 and providing a leakproof seal as before.

Alternatively, it will be obvious to those skilled in the art that member 94 may be provided with unthreaded apertures 96 and 98 proximate the circumferential end portions 100 and 102, respectively and link member 106 may be provided with threaded apertures 108 and 110 proximate each end thereof. Screw 113 may be inserted through aperture 98 initially and securely threadedly engaged in threaded aperture 108. The screw 111 may then be threadedly engaged in aperture 110 and extend into aperture 96 when apertures 96 and 110 come into alignment as circumferentially extending member 94 is expanded by the expansion tool 46. Due to the relatively large reactive compressive forces exerted on the clamp 10, the foregoing arrangement will securely and firmly lock the clamp into its operative sealing engagement relative to the gasket 18 and inner surface of the pipe 14.

It is desired that the subject invention be limited only by the spirit and scope of the appended claims.

We claim:

1. An expansion clamp for use with a resilient tubular gasket having radially spaced axially extending inner and outer surfaces, the outer surface of said gasket adapted to engage the inner surface of a tubular body at an opening therein, said clamp comprising:
  a. a circumferentially extending member adapted to be maintained in compressive relation with said radially spaced inner surface of said tubular gasket and said inner surface of said tubular body, said member having a substantially C-shaped transverse cross-section to define a channel with the opening thereof extending radially inwardly;
  b. one circumferential end of said channel terminating in an end portion adapted to be received within the other circumferential end of said channel, said other circumferential end including an inwardly axially extending lip on said channel to prevent radial displacement of said one end portion; and
  c. means for slidably engaging and locking said one circumferential end portion within said other circumferential end in a predetermined fixed position to maintain said compressive relation, said means including a transverse aperture contained on said circumferentially extending member disposed proximate to said one end thereof and said other end terminating in a relatively flat circumferentially extending portion having at its free end a hook-shaped part adapted to engage said transverse aperture in said predetermined fixed position.

2. An expansion clamp for use with a resilient tubular gasket having radially spaced axially extending inner and outer surfaces, the outer surface of said gasket adapted to engage the inner surface of a tubular body at an opening therein, said clamp comprising:
  a. a circumferentially extending member adapted to be maintained in compressive relation with said radially spaced inner surface of said tubular gasket and said inner surface of said tubular body, said member having a substantially C-shaped transverse cross-section to define a channel with the opening thereof extending radially inwardly;

b. one circumferential end of said channel terminating in an end portion adapted to be received within the other circumferential end of said channel, said other circumferential end including an inwardly axially extending lip on said channel to prevent radial displacement of said one end portion; and c. means for slidably engaging and locking said one circumferential end portion within said other circumferential end in a predetermined fixed position to maintain said compressive relation, said means including on said one circumferential end portion:

i. a link having an aperture having a relatively narrow longitudinal portion and a relatively larger circular-shaped aperture portion adjacent one end of said link, said link being adapted to slidably engage said other end of said member;

ii. means fixedly retaining said link on said one end of said member with said aperture extending beyond said one end of said member and with said circular-shaped portion remote from said one end of said member; and iii. pin means adapted to be removably retained by said other end of said member and to slidably engage said relatively narrow aperture and be retained by said circular-shaped aperture portion in said predetermined fixed position.

* * * * *